United States Patent
Chai et al.

(10) Patent No.: US 11,796,051 B1
(45) Date of Patent: Oct. 24, 2023

(54) GEARSHIFT CONTROL APPARATUS OF VEHICLE AND METHOD THEREOF

(71) Applicants: Hyundai Motor Company, Seoul (KR); Kia Corporation, Seoul (KR)

(72) Inventors: Min Jae Chai, Gwangmyeong-si (KR); Kwon Il Cho, Gwacheon-si (KR); Sang Jun Park, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/948,839

(22) Filed: Sep. 20, 2022

(30) Foreign Application Priority Data

May 13, 2022 (KR) .......................... 1020220058984

(51) Int. Cl.
| | | |
|---|---|---|
| *F16H 59/66* | (2006.01) | |
| *F16H 59/18* | (2006.01) | |
| *F16H 59/44* | (2006.01) | |
| *F16H 61/02* | (2006.01) | |
| *F16H 59/54* | (2006.01) | |

(52) U.S. Cl.
CPC ............. *F16H 59/66* (2013.01); *F16H 59/18* (2013.01); *F16H 59/44* (2013.01); *F16H 59/54* (2013.01); *F16H 61/0213* (2013.01); *F16H 2059/663* (2013.01); *F16H 2059/666* (2013.01)

(58) Field of Classification Search
CPC .......... F16H 59/18; F16H 59/44; F16H 59/54; F16H 59/66; F16H 2059/663; F16H 2059/666; F16H 61/0213; B60W 2554/80
See application file for complete search history.

(56) References Cited

U.S. PATENT DOCUMENTS

| | | | | |
|---|---|---|---|---|
| 5,902,345 | A * | 5/1999 | Minowa ................ | B60W 40/06 701/111 |
| 10,661,776 | B1 | 5/2020 | Kook et al. | |
| 2016/0076894 | A1* | 3/2016 | Choi ................. | B60W 50/0097 701/461 |
| 2017/0122430 | A1* | 5/2017 | Jerger ........................ | B60R 1/00 |
| 2018/0180731 | A1* | 6/2018 | Inoue ...................... | G01S 13/86 |
| 2020/0156618 | A1 | 5/2020 | Kook et al. | |
| 2022/0017091 | A1* | 1/2022 | Aucamp ............... | B60W 10/06 |

FOREIGN PATENT DOCUMENTS

KR        20200060592        6/2020

* cited by examiner

*Primary Examiner* — Edwin A Young
(74) *Attorney, Agent, or Firm* — Fish & Richardson P.C.

(57) ABSTRACT

A gearshift control apparatus of a vehicle includes: a sensor configured to measure a speed, a brake position sensor (BPS) value, and an accelerator position sensor (APS) value of the vehicle, and a controller configured to, in a gearshift section spaced apart by a preset distance from a speed bump located on a road on which the vehicle travels, (i) calculate a deceleration of the vehicle and a gradient of the road after the speed bump, (ii) determine a correction factor corresponding to the deceleration of the vehicle and the gradient of the road, and (iii) perform a gearshift to a shift stage corresponding to the correction factor and the speed of the vehicle.

18 Claims, 6 Drawing Sheets

GEARSHIFT CONTROL APPARATUS OF VEHICLE AND METHOD THEREOF

CROSS-REFERENCE TO RELATED APPLICATION

This application claims the benefit of priority to Korean Patent Application No. 10-2022-0058984, filed in the Korean Intellectual Property Office on May 13, 2022, the entire contents of which are incorporated herein by reference.

TECHNICAL FIELD

The present disclosure relates to a technology for preventing degradation of a gearshift performance and degradation of an acceleration performance of a vehicle, which are caused due to a speed bump.

BACKGROUND

In general, when a speed bump is located on a front side of a road, on which a vehicle travels, a driver performs deceleration before the vehicle passes over the speed bump, and performs acceleration after the vehicle passes over the speed bump. Then, because a gear stage is changed due to the deceleration before the vehicle passes over the speed bump, a gearshift control has to be performed to obtain a smooth acceleration force during acceleration of the vehicle thereafter.

According to a conventional gearshift control technology, second travel data after the vehicle passes over the speed bump is predicted based on first travel data in a specific section before the vehicle reaches the speed bump, a predicted gear ratio of the vehicle is calculated based on the predicted second travel data and a gradient of a specific section of a front road, a gear stage is determined based on the predicted gear ratio, and a gearshift of the vehicle is controlled according to the determined gear stage.

According to the conventional technology, a predicted acceleration is calculated when the driver manipulates a brake and a downward gearshift to a shift stage corresponding thereto is performed, and then physical time for the downward gearshift is not sufficient so that the driver manipulates an accelerator pedal before the downward gearshift is completely performed.

Furthermore, according to the conventional technology, because the predicted acceleration (predicted driving force) has to be calculated when the driver manipulates the brake, a calculation load is high.

In addition, according to the conventional technology, because the driver manipulates the accelerator pedal while the downward gearshift is not finished, the acceleration of the vehicle is delayed until the downward gearshift is finished.

SUMMARY

An aspect of the present disclosure provides a gearshift control apparatus of a vehicle, which may perform a primary gearshift to a shift stage corresponding to a speed of the vehicle in a first gearshift section (a preliminary gearshift section) corresponding to a first spacing distance from a speed bump located on a road, on which the vehicle travels, calculate a deceleration of the vehicle and a gradient of the road after the speed bump in a second gearshift section corresponding to a second spacing distance from the speed bump, determine a correction factor corresponding to the deceleration of the vehicle and the gradient of the road, and perform a secondary gearshift to a shift stage corresponding to the correction factor and the shift stage corresponding to the speed of the vehicle whereby a gearshift performance and an acceleration performance of the vehicle may be enhanced, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a gearshift control apparatus of a vehicle includes a sensor part that measure a speed, a brake position sensor (BPS) value, and an accelerator position sensor (APS) value of the vehicle, and a controller that, in a gearshift section spaced apart from a speed bump located on a road, on which the vehicle travels, by a preset distance, calculate a deceleration of the vehicle and a gradient of the road after the speed bump, determine a correction factor corresponding to the deceleration of the vehicle and the gradient of the road, and perform a gearshift to a shift stage corresponding to the correction factor and the speed of the vehicle.

In some implementations, the controller may perform a preliminary gearshift to a shift stage corresponding to the speed of the vehicle in a preliminary gearshift section located before the gearshift section.

In some implementations, the controller may perform the preliminary gearshift when the APS value is 0.

In some implementations, the controller may calculate the deceleration of the vehicle in the gearshift section, based on the speed of the vehicle and the BPS value of the vehicle.

In some implementations, the controller may calculate an average of gradients for specific sections of the road after the speed bump as the gradient of the road.

In some implementations, the controller may acquire gradient information for the specific sections after the speed bump from a navigation device provided in the vehicle.

In some implementations, the gearshift control apparatus may further include a storage part that stores a first gearshift table, in which the shift stage corresponding to the speed of the vehicle is recorded, a correction factor table, in which a correction factor corresponding to the deceleration of the vehicle and the gradient of the road after the speed bump is recorded, and a second gearshift table, in which the shift stage corresponding to the correction factor and the speed of the vehicle is recorded.

In some implementations, the controller may acquire speed information of the vehicle from the sensor part in a preliminary gearshift section located before the gearshift section, and performs a preliminary gearshift to a shift stage corresponding to the acquired speed of the vehicle, based on the first gearshift table.

In some implementations, the controller may determine the correction factor corresponding to the deceleration of the vehicle and the gradient of the road after the speed bump, based on the correction factor table.

In some implementations, the controller may determine the shift stage corresponding to the correction factor and the speed of the vehicle based on the second gearshift table, and performs a gearshift to the determined shift stage.

According to an aspect of the present disclosure, a method for controlling, by a sensor part, a gear shift of a vehicle includes measuring a speed, a brake position sensor (BPS) value, and an accelerator position sensor (APS) value of the vehicle, calculating, by a controller, in a gearshift section spaced apart from a speed bump located on a road, on which the vehicle travels, by a preset distance, a deceleration of the vehicle and a gradient of the road after the speed bump, determining, by the controller, a correction factor corresponding to the deceleration of the vehicle and the gradient of the road, and performing, by the controller, a gearshift to a shift stage corresponding to the correction factor and the speed of the vehicle.

In some implementations, the method may further include performing a preliminary gearshift to a shift stage corresponding to the speed of the vehicle in a preliminary gearshift section located before the gearshift section when the APS value is 0.

In some implementations, the calculating may include calculating the deceleration of the vehicle in the gearshift section, based on the speed of the vehicle and the BPS value of the vehicle, acquiring gradient information for the specific sections after the speed bump from a navigation device provided in the vehicle, and calculating an average of gradients for specific sections of the road after the speed bump as the gradient of the road.

In some implementations, the method may further include storing, by the storage part, a first gearshift table, in which the shift stage corresponding to the speed of the vehicle is recorded, a correction factor table, in which a correction factor corresponding to the deceleration of the vehicle and the gradient of the road after the speed bump is recorded, and a second gearshift table, in which the shift stage corresponding to the correction factor and the speed of the vehicle is recorded.

In some implementations, the method may further include acquiring speed information of the vehicle from the sensor part in a preliminary gearshift section located before the gearshift section, and performing a preliminary gearshift to a shift stage corresponding to the acquired speed of the vehicle, based on the first gearshift table when the APS value is 0.

In some implementations, the determining of the correction factor may include determining the correction factor corresponding to the deceleration of the vehicle and the gradient of the road after the speed bump, based on the correction factor table.

In some implementations, the performing of the gearshift may include determining the shift stage corresponding to the correction factor and the speed of the vehicle based on the second gearshift table, and performing a gearshift to the determined shift stage.

DETAILED DESCRIPTION

Figure 1:
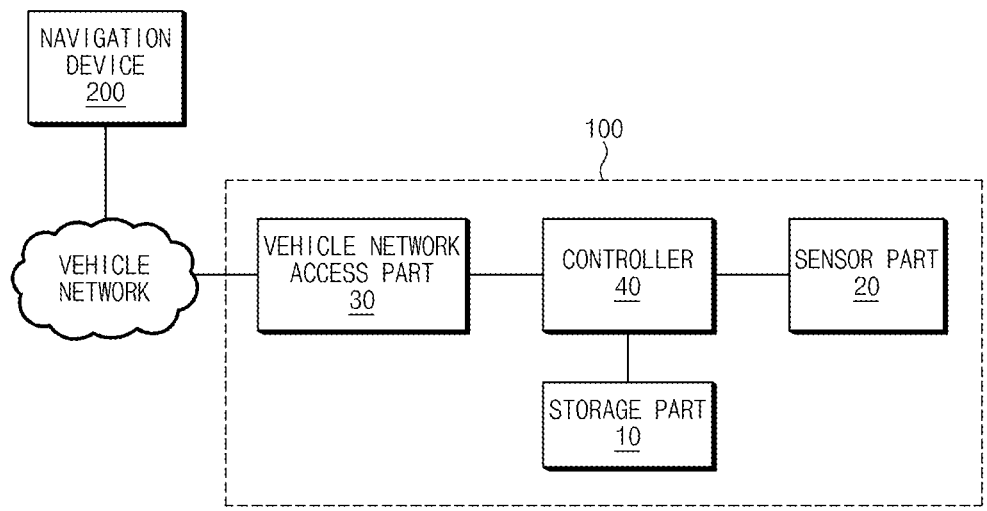
FIG. 1 is a diagram of a gearshift control apparatus of a vehicle.

FIG. 1 is a diagram of a gearshift control apparatus of a vehicle.

As illustrated in FIG. 1, a gearshift control apparatus 100 of a vehicle may include a storage part 10, a sensor part 20, a vehicle network access part 30, and a controller 40. The elements may be coupled to each other to be implemented as a single body or some of the elements may be omitted depending on a scheme of carrying out the gearshift control apparatus 100 of a vehicle.

In a discussion of the elements, first, the storage part 10 may store various logics, algorithms, and programs, for performing a primary gearshift to a shift stage corresponding to a speed of the vehicle in a first gearshift section 360 corresponding to a first spacing distance from a speed bump located on a road, on which the vehicle travels, calculating a deceleration of the vehicle and a gradient of the road after the speed bump in a second gearshift section 370 corresponding to a second spacing distance from the speed bump, and determining a correction factor corresponding to the deceleration of the vehicle and the gradient of the road, and performing a secondary gearshift to a shift stage corresponding to the correction factor and the speed of the vehicle. Here, the first gearshift section 360 may be referred to as a preliminary gearshift section, and the second gearshift section 370 may be referred to as a gearshift section (see FIG. 3).

The storage part 10 may store a table, that is, a first gearshift table used for the first gearshift section 360, in which the shift stage corresponding to the speed of the vehicle is recorded. As an example, the first gearshift table is as in Table 1 as follows.

TABLE 1

| Shift stage | Stage 3 | Stage 4 | Stage 5 | Stage 6 | Stage 7 |
|---|---|---|---|---|---|
| Vehicle speed (kph) | Less than 40 | Not less than 40 Less than 50 | Not less than 50 Less than 60 | Not less than 60 Less than 70 | Not less than 70 |

In Table 1, a shift stage corresponding to a speed of less than 40 kph is stage 3, a shift stage corresponding to a speed of not less than 40 kph and less than 50 kph is stage 4, a shift stage corresponding to a speed of not less than 50 kph and less than 60 kph is stage 5, a shift stage corresponding to a speed of not less than 60 kph and less than 70 kph is stage 6, and a shift stage corresponding to a speed of not less than 70 kph is stage 7.

The storage part 10 may store a table, that is, a correction factor table, used for the second gearshift section 370, in which the correction factor corresponding to the deceleration of the vehicle and the gradient of the road after the speed bump are recorded. As an example, the correction factor table is as Table 2 as follows.

TABLE 2

| Gradient (%) | Deceleration | | | | |
|---|---|---|---|---|---|
| | −0.5 | ... | −2 | ... | −4 |
| 15 | 0 | ... | 0.2 | ... | 0.5 |
| ... | ... | ... | ... | ... | ... |
| 0 | 0.2 | ... | 0.6 | ... | 1 |
| ... | ... | ... | ... | ... | ... |
| −15 | 0.6 | ... | 1 | ... | 1 |

The storage part 10 may store a table, that is, a second gearshift table, used for the second gearshift section 370, in which the shift stage corresponding to the correction factor and the speed of the vehicle is recorded. As an example, the second gearshift table is as in Table 3 as follows.

TABLE 3

| Correction factor | Shift stage | Stage 2 | Stage 3 | Stage 4 | Stage 5 | Stage 6 | Stage 7 |
|---|---|---|---|---|---|---|---|
| 0 | Vehicle speed (kph) | Less than 20 | Not less than 20 Less than 35 | Not less than 35 Less than 45 | Not less than 45 Less than 55 | Not less than 55 Less than 70 | Not less than 70 |
| ... | ... | ... | ... | ... | ... | ... | ... |
| 1 | Vehicle speed (kph) | Less than 40 | Not less than 40 Less than 55 | Not less than 55 Less than 65 | Not less than 65 Less than 75 | Not less than 75 Less than 90 | Not less than 90 |

In Table 3, when the correction factor is 0, a shift stage corresponding to a speed of less than 20 kph is stage 2, a shift stage corresponding to a speed of not less than 20 kph and less than 35 kph is stage 3, a shift stage corresponding to a speed of not less than 35 kph and less than 45 kph is stage 4, a shift stage corresponding to a speed of not less than 45 kph and less than 55 kph is stage 5, a shift stage corresponding to a speed of not less than 55 kph and less than 70 kph is stage 6, and a shift stage corresponding to a speed of not less than 70 kph is stage 7.

In Table 3, when the correction factor is 1, a shift stage corresponding to a speed of less than 40 kph is stage 2, a shift stage corresponding to a speed of not less than 40 kph and less than 55 kph is stage 3, a shift stage corresponding to a speed of not less than 55 kph and less than 65 kph is stage 4, a shift stage corresponding to a speed of not less than 65 kph and less than 75 kph is stage 5, a shift stage corresponding to a speed of not less than 75 kph and less than 90 kph is stage 6, and a shift stage corresponding to a speed of not less than 90 kph is stage 7.

The storage part 10 may include a memory, such as a flash memory type, a hard disk type, a micro type, or a card type (for example, a secure digital (SD) card or an eXtream digital (XD) card), and a storage medium of at least one of memories, such as a random access memory (RAM), a static RAM (SRM), a read-only memory (ROM), a programmable ROM (PROM), an electrically erasable PROM (EEPROM), a magnetic RAM (MRAM), a magnetic disk, and an optical disk.

The sensor part 20 may include one or more sensors that sense an obstacle located around the vehicle and detect information of the corresponding obstacle. As an example, the sensor part 20 may include a lidar or a camera for detecting information (a size, a shape, a spacing distance, and the like) on a speed bump on a front road. Furthermore, the sensor part 20 may further include a sensor that measures a speed of the vehicle, an accelerator position sensor (APS) that detects a pushing degree (%) of an accelerator pedal, and a brake position sensor (BPS) that detects a pushing degree (%) of a brake pedal. Here, as an example, a speed bump detected by the sensor part 20 may be as illustrated in FIG. 2.

Figure 2:
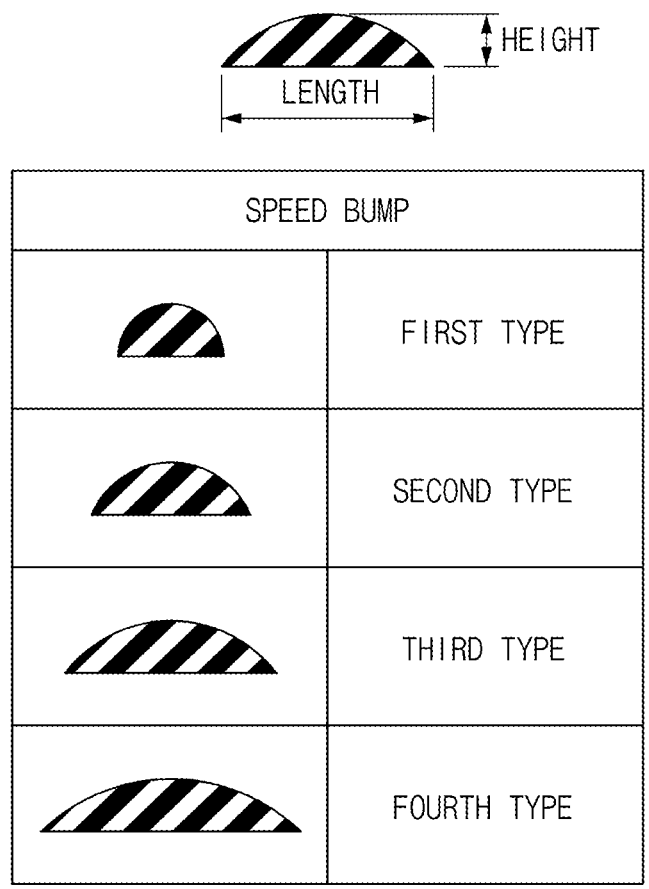
FIG. 2 is an exemplary view illustrating a speed bump detected by a sensor provided in a gearshift control apparatus of a vehicle.

FIG. 2 is an exemplary view illustrating the speed bump detected by the sensor part provided in the gearshift control apparatus of a vehicle.

As illustrated in FIG. 2, the sensor part 20 provided in the gearshift control apparatus of a vehicle may detect various types of speed bumps.

For example, a speed bump of a first type may have a height of 7.5 cm and a length of 1 m, a speed bump of a second type may have a height of 7.5 cm and a length of 2 m, a speed bump of a third type may have a height of 10 cm and a length of 3.6 m, and a speed bump of a fourth type may have a height of 12.5 cm and a length of 6.1 m.

The vehicle network access part 30 is a module that provides an access interface with a vehicle network, and the controller 40 may acquire location information of the speed bump from a navigation device 200 through the vehicle network, and also may acquire gradient information of the road after the speed bump. Then, the gradient information provided by the navigation device 200 may be gradient information in unit of a preset distance (for example, 10 m).

Here, the network of the vehicle may include a controller area network (CAN), a controller area network with a flexible data-rate (CAN FD), a local interconnect network (LIN), FlexRay, media oriented systems transport (MOST), and Ethernet.

The controller 40 may perform an overall control such that the elements may normally perform their functions. The controller 40 may be implemented in a form of hardware, may be implemented in a form of software, or may be implemented in a form of a combination of hardware and software. Preferably, the controller 40 may be implemented by a microprocessor, but the present disclosure is not limited thereto.

In particular, the controller 40 may perform various controls for the process of performing the primary gearshift to the shift stage corresponding to the speed of the vehicle in the first gearshift section 360 corresponding to the first spacing distance from the speed bump located on the road, on which the vehicle travels, calculating the deceleration of the vehicle and the gradient of the road after the speed bump in the second gearshift section 370 corresponding to the second spacing distance from the speed bump, and determining the correction factor corresponding to the deceleration of the vehicle and the gradient of the road, and performing the secondary gearshift to the shift stage corresponding to the correction factor and the speed of the vehicle.

Hereinafter, an operation of the controller 40 will be discussed in detail with reference to FIGS. 3 and 4.

Figure 3:
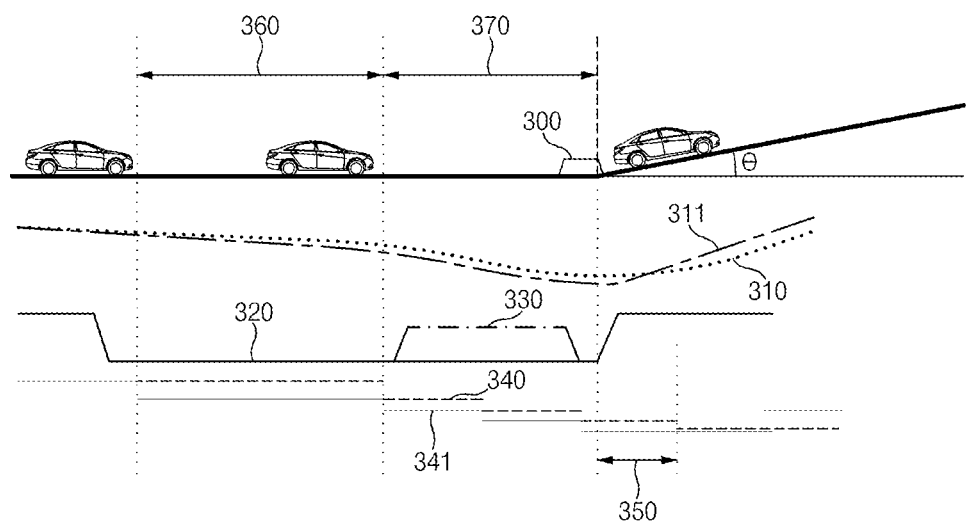
FIG. 3 is an exemplary view illustrating a process of controlling a gearshift of a vehicle by a controller provided in a gearshift control apparatus of a vehicle.

FIG. 3 is an exemplary view illustrating a process of controlling the gearshift of the vehicle by the controller provided in the gearshift control apparatus of the vehicle.

In FIG. 3, '300' denotes a speed bump, '0' denotes a gradient of the road after the speed bump 300, '310' denotes a speed of a vehicle according to a conventional scheme, '311' denotes a speed of the vehicle according to a scheme of the present disclosure, '320' denotes a value (hereinafter, an APS value) measured by the APS, '330' denotes a value (hereinafter, a BPS value) measured by the BPS, '340' denotes a shift stage according to the conventional scheme, '341' denotes a shift stage according to the scheme of the present disclosure, '360' denotes the first gearshift section, and '370' denotes the second gearshift section.

The controller 40 may periodically acquire speed information of the vehicle through the sensor part 20 in the first gearshift section 360, and may perform the primary gearshift to the shift stage corresponding to the acquired speed of the vehicle, based on the first gearshift table stored in the storage part 10. Then, the controller 40 may perform a plurality of gearshifts when the speed of the vehicle is changed in the first gearshift section 360. It is preferable that the primary gearshift process is performed when the APS value 320 is zero, that is, when a driver does not push the accelerator pedal.

As illustrated in FIG. 3, it may be seen that a gearshift of a vehicle is not performed in the first gearshift section 360 in the conventional scheme 340 but a downward gearshift of the vehicle is performed in the first gearshift section 360 in the scheme 341 of the present disclosure. In this way, because the primary gearshift is performed in the first gearshift section 360, a time for a gearshift in the second gearshift section 370 may be shortened, and accordingly, the secondary gearshift is finished before the accelerator pedal is manipulated by the driver, and consequently, a delay of acceleration may be prevented.

The controller 40 may calculate the deceleration of the vehicle in the second gearshift section 370, based on the speed 311 and the BPS value 330 of the vehicle, which has been periodically acquired by the sensor part 20, in the second gearshift section 370.

The controller 40 may calculate the gradient (θ) of the road after the speed bump 300 in the second gearshift section 370. Then, the controller 40 may calculate an average of gradients for a specific section (for example, 10 m), which are acquired from the navigation device 200 through the vehicle network as the gradient (θ) of the road.

For example, the controller 40 may determine the gradient (θ) of the road as 12° when the gradient of the road from the speed bump 300 to a point (hereinafter, a first point) of 10 m after the speed bump 300 is 12°, the gradient of the road from the first point to a point (hereinafter, a second point) of 10 m after the first point is 9°, and the gradient of the road from the second point to a point (hereinafter, a third point) of 10 m after the second point is 15°.

For reference, the gradient of the road may be a value obtained by expressing angles of 0° to 45° by 0% to 100%. As an example, 3.6° becomes 8%, and 6.75° becomes 15%.

For example, the controller 40 may determine the gradient (%) of the road as 4.65% when the gradient of the road from the speed bump 300 to a point (hereinafter, the first point) of 10 m after the speed bump 300 is 3.6%, the gradient of the road from the first point to a point (hereinafter, the second point) of 10 m after the first point is 6.75%, and the gradient of the road from the second point to a point (hereinafter, the third point) of 10 m after the second point is 3.6%.

The controller 40 may determine the correction factor corresponding to the calculated deceleration of the vehicle and the gradient (%) of the road after the speed bump 300, based on a correction factor table stored in the storage part 10.

The controller 40 may determine the shift stage corresponding to the determined correction factor and the speed of the vehicle, based on the second gearshift table stored in the storage part 10, and may perform the secondary gearshift to the determined stage.

As illustrated in FIG. 3, a gearshift time is not sufficient and a downward gearshift is not finished even after the vehicle passes over the speed bump 300 in the conventional scheme, and thus acceleration of the vehicle is delayed (310), whereas the primary gearshift is performed in the first gearshift section 360 and the downward gearshift is already finished while the vehicle passes over the speed bump 300 thereafter in the scheme of the present disclosure (350), and thus acceleration of the vehicle is not delayed (311).

Figure 4:
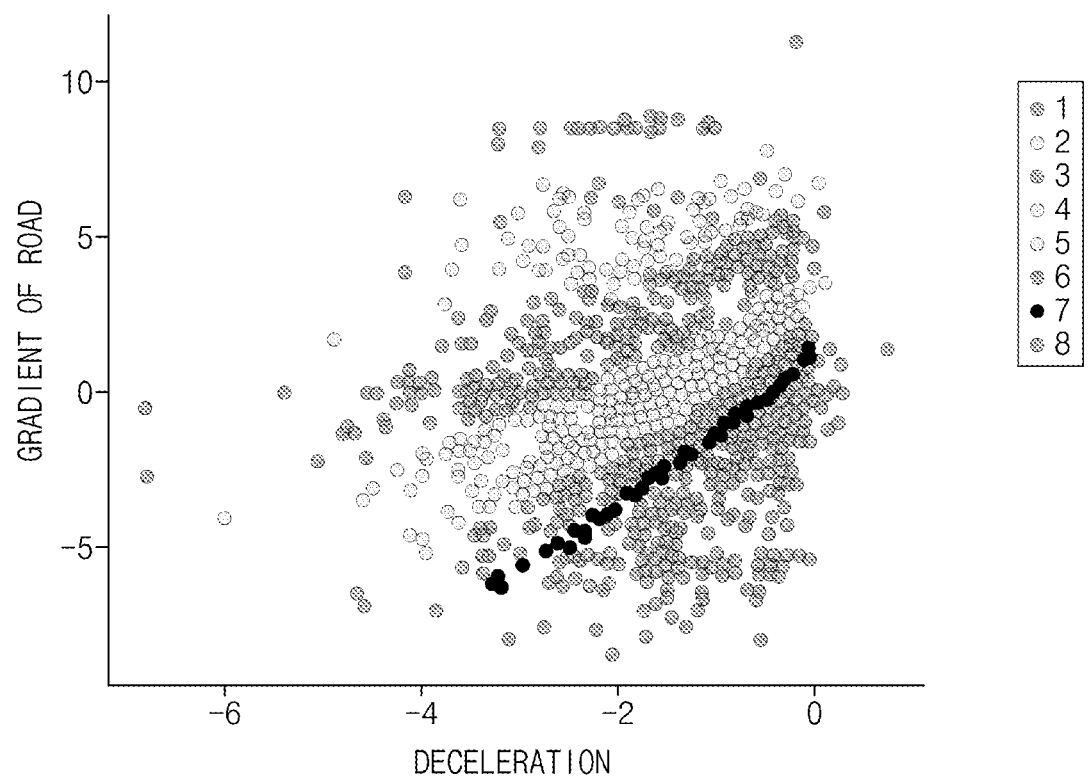
FIG. 4 is an exemplary view illustrating a process of determining a parameter used for a gearshift of a vehicle by a deceleration of the vehicle and a gradient by a gearshift control apparatus of the vehicle.

FIG. 4 is an exemplary view illustrating a process of determining a parameter used for the gearshift of the vehicle by the deceleration of the vehicle and the gradient by the gearshift control apparatus of the vehicle.

First, a deceleration, a gradient, an inter-vehicle distance, and a drive tendency are included in a candidate group of parameters used for the gearshift of the vehicle, and a root mean square error (RMSE) for an actual APS value after a linear return is calculated based on Equation 1 as follows. The calculated result is as in Table 1 as follows.

$$RMSE = \sqrt{\frac{1}{n}\sum_{i=1}^{n}(V\_real - V\_predict)^2} \qquad [\text{Equation 1}]$$

TABLE 4

| RMSE | Deceleration | Gradient | Inter-vehicle distance | Drive tendency |
|---|---|---|---|---|
| APS | 9.3 | 8.8 | 9.5 | 9.8 |

As also may be seen through Table 4, since an RMSE of the deceleration and an RMSE of the gradient become minimal, the deceleration of the vehicle and the gradient of the road are determined as parameters used for the gearshift of the vehicle. The shift stage determined according to the deceleration of the vehicle and the gradient of the road are as illustrated in FIG. 4. The correction factor table stored in the storage part 10 may be derived from the shift stage corresponding to the deceleration of the vehicle and the gradient of the road illustrated in FIG. 4.

Figure 5:
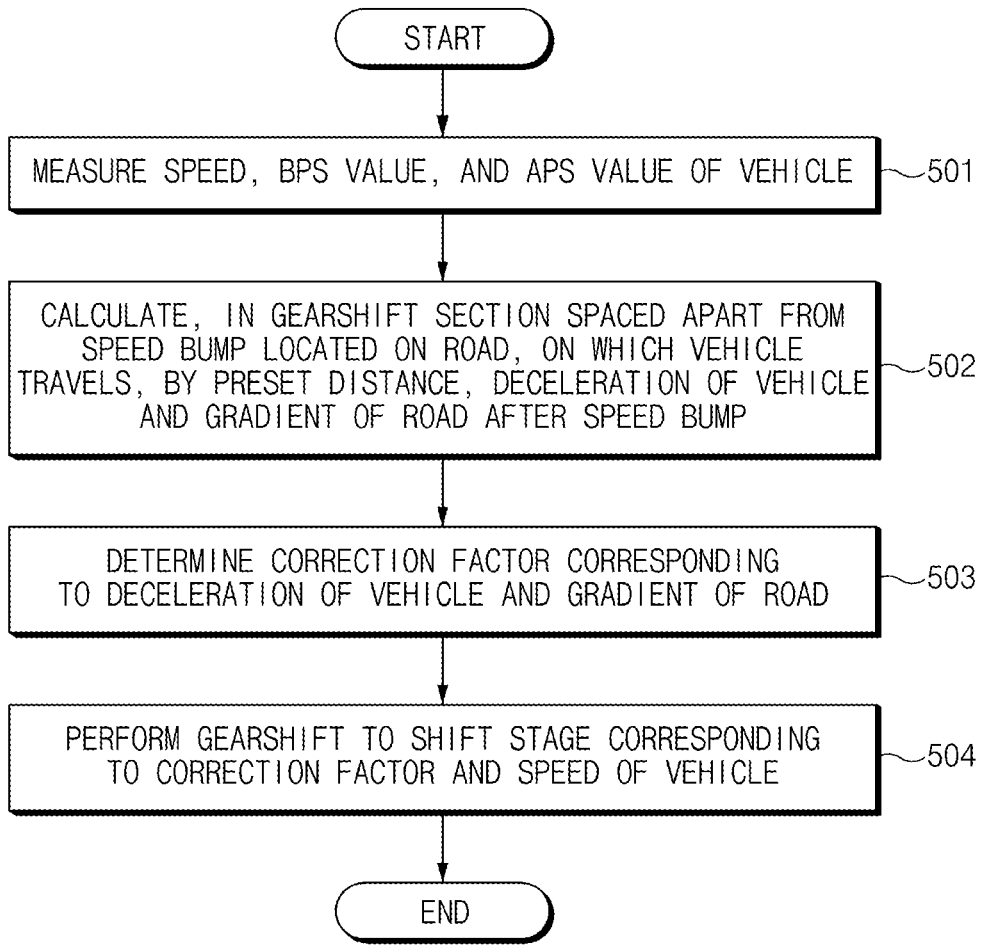
FIG. 5 is a flowchart of a method for controlling a gearshift of a vehicle.

FIG. 5 is a flowchart of a method for controlling the gearshift of a vehicle.

First, by the sensor part 20 measures a speed, a brake position sensor (BPS) value, and an accelerator position sensor (APS) value of the vehicle (501).

Thereafter, in the gearshift section spaced apart from the speed bump located on the road, on which the vehicle travels, by a preset distance, the controller 40 measures the deceleration of the vehicle, and the gradient of the road after the speed bump (502).

Thereafter, the controller 40 determines the correction factor corresponding to the deceleration of the vehicle and the gradient of the road (503).

Thereafter, the controller 40 performs the gearshift to the shift stage corresponding to the correction factor and the speed of the vehicle (504).

Figure 6:
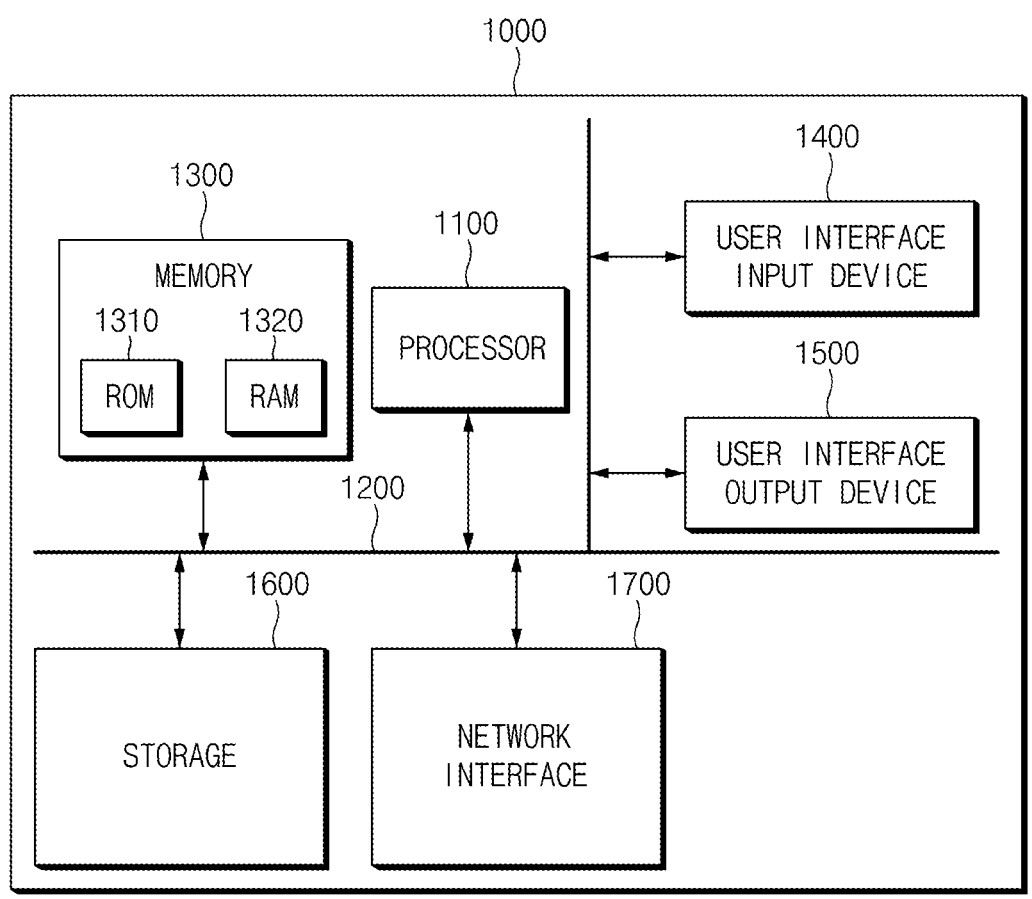
FIG. 6 is a block diagram illustrating a computing system for executing a method for controlling a gearshift of a vehicle.

FIG. 6 is a block diagram illustrating a computing system for executing a method for controlling a gearshift of a vehicle.

Referring to FIG. 6, the method for controlling the gearshift of the vehicle also may be implemented through a computing system. The computing system 1000 may include at least one processor 1100 a memory 1300, a user interface input device 1400, a user interface output device 1500, a storage 1600, and a network interface 1700 connected through a system bus 1200.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) 1310 and a random access memory (RAM) 1320.

Accordingly, the steps of the method or algorithm described in relation to the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the gearshift control method of a vehicle and the method thereof, the primary gearshift to the shift stage corresponding to the speed of the vehicle in the first gearshift section (the preliminary gearshift section) corresponding to the first spacing distance from the speed bump located on the road, on which the vehicle travels, may be performed, the deceleration of the vehicle and the gradient of the road after the speed bump in the second gearshift section corresponding to the second spacing distance from the speed bump may be calculated, the correction factor corresponding to the deceleration of the vehicle and the gradient of the road may be determined, and the secondary gearshift to the shift stage corresponding to the correction factor and the speed of the vehicle may be performed whereby a gearshift performance and an acceleration performance of the vehicle may be enhanced.

What is claimed is:

1. A gearshift control apparatus of a vehicle, comprising:
a sensor configured to measure a speed, a brake position sensor (BPS) value, and an accelerator position sensor (APS) value of the vehicle; and
a controller configured to, in a gearshift section spaced apart by a preset distance from a speed bump located on a road on which the vehicle travels, (i) calculate a deceleration of the vehicle and a gradient of the road after the speed bump, (ii) determine a correction factor corresponding to the deceleration of the vehicle and the gradient of the road, and (iii) perform a gearshift to a shift stage corresponding to the correction factor and the speed of the vehicle.

2. The gearshift control apparatus of claim 1, wherein the controller is configured to perform a preliminary gearshift to a shift stage corresponding to the speed of the vehicle in a preliminary gearshift section located before the gearshift section.

3. The gearshift control apparatus of claim 2, wherein the controller is configured to, based on the APS value being zero, perform the preliminary gearshift.

4. The gearshift control apparatus of claim 1, wherein the controller is configured to calculate the deceleration of the vehicle in the gearshift section, based on the speed of the vehicle and the BPS value of the vehicle.

5. The gearshift control apparatus of claim 1, wherein the controller is configured to calculate an average of gradients for sections of the road after the speed bump as the gradient of the road.

6. The gearshift control apparatus of claim 5, wherein the controller is configured to acquire gradient information for the sections after the speed bump from a navigation device provided in the vehicle.

7. The gearshift control apparatus of claim 1, further comprising:
a storage configured to store (i) a first gearshift table including a shift stage corresponding to the speed of the vehicle, (ii) a correction factor table including a correction factor corresponding to the deceleration of the vehicle and the gradient of the road after the speed bump, and (iii) a second gearshift table including the shift stage corresponding to the correction factor and the speed of the vehicle.

8. The gearshift control apparatus of claim 7, wherein the controller is configured to:
acquire the speed of the vehicle from the sensor in a preliminary gearshift section located before the gearshift section, and
perform a preliminary gearshift to a shift stage corresponding to the acquired speed of the vehicle, based on the first gearshift table.

9. The gearshift control apparatus of claim 8, wherein the controller is configured to, based on the APS value being zero, perform the preliminary gearshift.

10. The gearshift control apparatus of claim 7, wherein the controller is configured to determine the correction factor corresponding to the deceleration of the vehicle and the gradient of the road after the speed bump, based on the correction factor table.

11. The gearshift control apparatus of claim 7, wherein the controller is configured to:
determine the shift stage corresponding to the correction factor and the speed of the vehicle based on the second gearshift table, and
perform a gearshift to the determined shift stage.

12. A method for controlling a gearshift of a vehicle, the method comprising:
measuring, by a sensor, a speed, a brake position sensor (BPS) value, and an accelerator position sensor (APS) value of the vehicle;
calculating, by a controller, in a gearshift section spaced apart by a preset distance from a speed bump located on a road on which the vehicle travels, a deceleration of the vehicle and a gradient of the road after the speed bump;

determining, by the controller, a correction factor corresponding to the deceleration of the vehicle and the gradient of the road; and performing, by the controller, a gearshift to a shift stage corresponding to the correction factor and the speed of the vehicle.

13. The method of claim 12, further comprising:

performing, based on the APS value being zero, a preliminary gearshift to a shift stage corresponding to the speed of the vehicle in a preliminary gearshift section located before the gearshift section, by the controller.

14. The method of claim 12, wherein calculating the deceleration of the vehicle includes:

calculating, by the controller, the deceleration of the vehicle in the gearshift section, based on the speed of the vehicle and the BPS value of the vehicle;

acquiring, by the controller, gradient information for sections after the speed bump from a navigation device provided in the vehicle; and calculating, by the controller, an average of gradients for the sections of the road after the speed bump as the gradient of the road.

15. The method of claim 12, further comprising:

storing, by a storage, (i) a first gearshift table including a shift stage corresponding to the speed of the vehicle, (ii) a correction factor table including a correction factor corresponding to the deceleration of the vehicle and the gradient of the road after the speed bump, and (iii) a second gearshift table including the shift stage corresponding to the correction factor and the speed of the vehicle.

16. The method of claim 15, further comprising:

acquiring, by the controller, the speed of the vehicle from the sensor in a preliminary gearshift section located before the gearshift section; and performing, based on the APS value being zero, a preliminary gearshift to a shift stage corresponding to the acquired speed of the vehicle by the controller, according to the first gearshift table.

17. The method of claim 15, wherein determining the correction factor includes:

determining, by the controller, the correction factor corresponding to the deceleration of the vehicle and the gradient of the road after the speed bump, based on the correction factor table.

18. The method of claim 15, wherein performing the gearshift includes:

determining, by the controller, the shift stage corresponding to the correction factor and the speed of the vehicle based on the second gearshift table; and performing, by the controller, a gearshift to the determined shift stage.

* * * * *